United States Patent
Suárez Cambre et al.

(10) Patent No.: US 8,942,481 B2
(45) Date of Patent: Jan. 27, 2015

(54) THREE DIMENSIONAL CMOS IMAGE PROCESSOR FOR FEATURE DETECTION

(75) Inventors: Manuel Suárez Cambre, Arteixo (ES); Víctor Manuel Brea Sánchez, Santiago de Compostela (ES); Fernando Rafael Pardo Seco, Santiago de Compostela (ES); Ángel Rodríguez Vázquez, Seville (ES); Ricardo Carmona Galán, Seville (ES)

(73) Assignees: Universidad de Santiago de Compostela, Santiago de Compostela (ES); Consejo Superior de Investigaciones Científicas, Madrid (ES); Universidad de Sevilla, Seville (ES)

( * ) Notice: Subject to any disclaimer, the term of this patent is extended or adjusted under 35 U.S.C. 154(b) by 475 days.

(21) Appl. No.: 13/417,279

(22) Filed: Mar. 11, 2012

(65) Prior Publication Data

US 2013/0236048 A1 Sep. 12, 2013

(51) Int. Cl.
*G06K 9/46* (2006.01)

(52) U.S. Cl.
USPC ........... 382/190; 382/181; 382/312; 382/313; 382/321; 382/103; 250/200; 250/206; 250/208.1

(58) Field of Classification Search
None
See application file for complete search history.

(56) References Cited

U.S. PATENT DOCUMENTS

| | | | | |
|---|---|---|---|---|
| 2006/0001753 | A1* | 1/2006 | Funakoshi et al. | 348/308 |
| 2008/0055143 | A1* | 3/2008 | Han et al. | 341/155 |
| 2009/0218606 | A1* | 9/2009 | McCaffrey et al. | 257/292 |
| 2009/0324026 | A1* | 12/2009 | Kletter | 382/124 |
| 2012/0033876 | A1* | 2/2012 | Momeyer et al. | 382/165 |
| 2012/0129301 | A1* | 5/2012 | Or-Bach et al. | 438/129 |
| 2012/0267511 | A1* | 10/2012 | Kozlowski | 250/208.1 |
| 2012/0307030 | A1* | 12/2012 | Blanquart | 348/76 |
| 2012/0314110 | A1* | 12/2012 | Kobayashi et al. | 348/302 |
| 2012/0326008 | A1* | 12/2012 | McKee et al. | 250/208.1 |
| 2013/0062522 | A1* | 3/2013 | Jiang et al. | 250/338.4 |
| 2013/0206990 | A1* | 8/2013 | Hsu et al. | 250/338.4 |

OTHER PUBLICATIONS

Vázquez et al. ["Chapter 6 a CMOS Vision System On-Chip with Multi-Core, Cellular Sensory-Processing Front-End," in Cellular Nanoscale Sensory Wave Computing, (2010 edition, Springer, Published Dec. 4, 2009), pp. 129-146.*

Bonato et al. "A Parallel Hardware Architecture for Scale and Rotation Invariant Feature Detection, Concurrent correlated double sampling and analog-to-digital conversion" Dec. 2008, IEEE, vol. 18, No. 12, pp. 1703-1712.*

Dubois et al., "A 10,000 fps CMOS Sensor With Massively Parallel Image Processing", 2008, IEEE Journal of Solid-State Circuits 43, 3 pp. 706-717.*

* cited by examiner

*Primary Examiner* — Matthew Bella
*Assistant Examiner* — Jason Heidemann
(74) *Attorney, Agent, or Firm* — Mateo Aboy; Aboy & Associates PC (57) ABSTRACT

Disclose embodiments include an image processor for feature detection comprising a single non-planar chip containing a plurality of integrated sensing and processing resources across two or more layers adapted to capture image frames and extract image features. In a particular embodiment, the non-planar chip is a three dimensional CMOS integrated circuit (3D CMOS IC) with vertical distribution of sensing and processing resources across two or more vertical integrated circuit layers. The 3D CMOS IC implements two or more feature detectors in a single chip by reusing a plurality of circuits employed for gradient and keypoint detection. Feature detectors include a scale invariant feature transform detector (SIFT), a Harris-based feature detector, and a Hessian-based feature detector.

10 Claims, 11 Drawing Sheets

THREE DIMENSIONAL CMOS IMAGE PROCESSOR FOR FEATURE DETECTION

TECHNICAL FIELD

Disclosed embodiments relate to image processors. Specifically, they relate to processors for image acquisition and feature detection.

BACKGROUND

Conventional image processor architectures operate frame by frame, that is, frames are first captured, then codified in digital domain, and finally processed. This approach benefits from the enormous computational power of digital processors in scaled down technologies, but it is neither the most efficient one in terms of processing speed (time lag from inputs to actions) nor in terms of energy consumption.

Scale and rotation invariant feature detectors are used in different image processing tasks such as object detection and classification, image retrieval, and image registration or tracking. Their invariant nature yields repeatability, which permits to deal with occlusion, or with scenes acquired under different conditions such as illumination, or different view angles. Modern scale- and rotation-invariant feature detectors as the Scale Invariant Feature Transform (SIFT) are complex image processing techniques with a high computational cost, making difficult its realization using regular microprocessors and software. A key part of this algorithm is the extraction of Gaussian pyramids, which comprise a set of images of different resolutions called octaves. Every octave is the result of a ¼ downscaling of the previous octave. In turn, every octave is made up of a series of images called scales. Every scale is the result of performing a Gaussian filtering with given width (σ-level) on a previous scale.

A feature detector algorithm was proposed in Harris and Stephens (Proc. Avley Vis. Conf., Manchester, pp. 147-152, 1998), whose main advantage is that the computations involved to obtain image features, called Harris corners, are not time-consuming. However, it offers poor results dealing with changes in scale and rotation in images.

The scale invariant feature detector algorithm (SIFT), presented in U.S. Pat. No. 6,711,293, is an image processing method to obtain scale and rotate invariant features from digital image. Its main limitation is given by the computational requirements of the method, which makes difficult its use on applications requiring real-time operation (e.g., to achieve a frame rate of 24 frames per second or higher).

To deal with the limitations of the original SIFT algorithm, a Field Programmable Gate Array (FPGA) implementation was presented by Bonato et al., (IEEE Trans Circuits Syst., 18(12), pp. 1703-1712, 2008). However, the image acquisition is not integrated within the processing cores, which slows down the processing. Additionally, the high power consumption of FPGAs makes it hard to integrate into a low power system for computing vision tasks.

Yao et al. (International Conference on Field-Programmable Technology, 2009. FPT 2009) introduced an FPGA implementation of the SIFT algorithm. As in the case of Bonato et al., in this disclosure image acquisition is not taken into account in the development of the system.

Kiyoyama et al., (IEEE International Conference on 3D System Integration, 2009), performed a study of a parallel signal processing circuit, which includes a pixel circuit and a parallel analog-to-digital converter (ADC) with hierarchical correlated double sampling (CDS). This disclosure focuses on image acquisition but does not address how to create the processing core.

BRIEF DESCRIPTION OF THE DRAWINGS

Disclosed embodiments are illustrated by way of example, and not by way of limitation, in the figures of the accompanying drawings.

DETAILED DESCRIPTION

A. Overall Apparatus Description

Disclosed embodiments include an image processor for feature detection comprising a single non-planar chip containing a plurality of integrated sensing and processing resources across two or more layers adapted to capture image frames and extract image features. According to a particular embodiment, the non-planar chip is a three dimensional CMOS integrated circuit with vertical distribution of sensing and processing resources across two or more vertical integrated circuit layers. More particularly, the three dimensional CMOS integrated circuit implements two or more feature detectors on a single chip. In one embodiment, and without limitation, these feature detectors are a scale invariant feature transform detector (SIFT), a Harris-based feature detector, a Hessian-based feature detector, or a combination thereof. Particularly, the three dimensional CMOS integrated circuit implements the feature detectors by reusing a plurality of circuits employed for gradient and keypoint detection. As an example, in one embodiment, the integrated circuit implements a pixel-per-processor architecture to achieve massive pixel-level parallelism and pixel-level operation capability, and includes an array of in-pixel processors and a plurality of circuits that in parallel realize the SIFT, Harris-based feature detector, and Hessian-based feature detector. Certain embodiments include a multiple purpose switched-capacitor network. This multiple purpose switched-capacitor network implements Gaussian pyramid generation, in-pixel correlated double sampling (CDS), and a pixel-level analog memory. A particular embodiment of the switched-capacitor network has a double Forward-Euler configuration. Similarly, the CMOS-3D IC includes shared reused circuits for in-pixel analog-to-digital conversion and frame buffering. In one particular embodiment, and without limitation, the circuits of the IC are arranged in four layers with (a) a tier for acquisition, correlated double sampling, Gaussian filtering, and analog-to-digital conversion; (b) a tier for digital frame buffering, keypoint detection, Difference-of-Gaussians (DoGs) calculation, gradient calculation, and shared analog-to-digital conversion; and (c) two tiers with a Dynamic Random Access Memory (DRAM).

Similarly, a method for achieving efficient image feature detection on an integrated circuit is disclosed. The method comprises: (a) implementing a single non-planar chip containing a plurality of integrated sensing and processing resources across two or more layers adapted to capture image frames and extract image features; and (b) reusing a plurality of circuits in the non-planar chip to achieve concurrent implementation of gradient and keypoint detection; and correlated double sampling (CDS) and analog-to-digital conversion. In a particular embodiment, the non-planar chip implements two or more feature detectors on a single chip. For instance, the feature detectors can be a scale invariant feature transform detector (SIFT), a Harris-based feature detector, a Hessian-based feature detector, or a combination thereof.

In a particular embodiment, the proposed image processor can be used as a CMOS-3D-based vision processor for running different feature detectors. The image processor enables the user to select the most appropriate feature detector according to the needs of the application. In one embodiment, the image processor executes two main modes: 1) SIFT mode, providing high accuracy at the cost of low speed, and 2) Harris and Hessian feature detectors, yielding speed in exchange of worse accuracy. Both modes are possible due to: 1) the CMOS-3D architecture, and 2) the fact that running SIFT implies to run some of the operations required for Harris- or Hessian-based algorithms. Particularly, the specific embodiment, and without limitation includes a pixel architecture with in-pixel CDS, and in-pixel A/D conversion by means of an 8-bit single-slope A/D converter. The reuse of different circuits permits to have a lower area for every pixel. Also, according to one embodiment, the architecture includes an assignment of 4 3 T APS per processor, rendering massively parallel processing, very adequate for operations at pixel-level, quite abundant in any feature detector. In a particular embodiment, the architecture is implemented with a two tier CMOS-3D stack. The top tier contains the pixels. Every pixel is completed with the circuits needed for a switched-capacitor network. Such a network implements Gaussian filtering, needed for many feature detectors. In a more particular example embodiment, and without limitation, the IC is designed as two-tier CMOS-3D architecture for generation of Gaussian pyramids, detection of extrema, and calculation of spatial derivatives in an image. Such tasks are included in modern feature detectors, which in turn can be used for operations like object detection, image registration or tracking. In an embodiment of the top tier, its architecture contains the image acquisition circuits in an array of 320×240 active photodiode sensors (APS) driving a smaller array of 160×120 analog processors for low-level image processing. The top tier comprises in-pixel Correlated Double Sampling (CDS), a switched-capacitor network for Gaussian pyramid generation, analog memories and a comparator for in-pixel Analog to Digital Converter (ADC). The reuse of circuits for different functions permits to have a small area for every pixel. According to one embodiment, the bottom tier of the architecture contains a frame buffer with a set of registers acting as a frame-buffer with a one-to-one correspondence with the analog processors in the top tier, the digital circuitry necessary for the extrema detection and the calculation of the first and second spatial derivatives in the image, as well as Harris and Hessian point detectors. As an example, and without limitation, the two-tier architecture can be implemented on a 130 nm CMOS-3D technology. A companion chip can perform the higher-level operations as well as communications. In this technology an area of 300 $\mu m^2$ per pixel (1200 $\mu m^2$ per processor) or lower is possible and lets a frame rate of 180 frames/s for an ADC conversion time of 120 $\mu s$.

B. Detailed Description of Particular Embodiments

Figure 1:
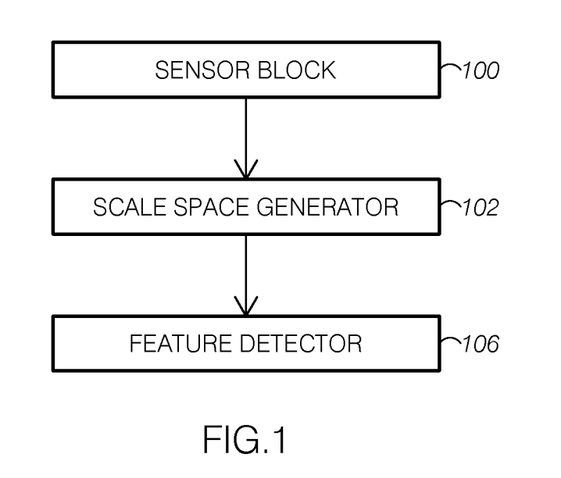
FIG. 1 shows a block diagram of an embodiment of the image processor.

Disclosed embodiments include an image processor for image feature detection comprising an image acquisition block 100, a scale space generation block 102, and a feature detector block 106.

Figure 2:
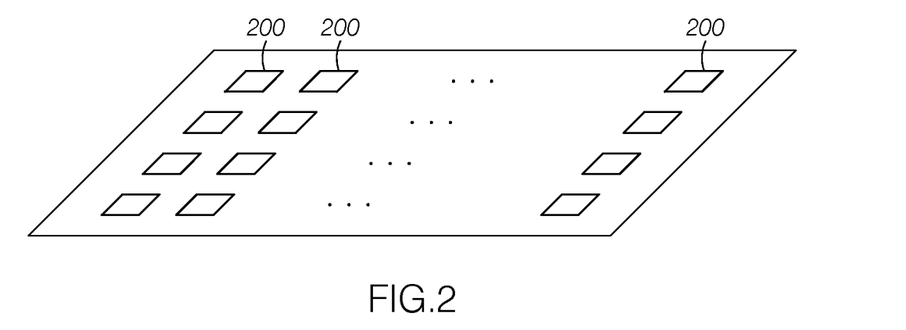
FIG. 2 shows an embodiment of the acquisition block showing the plurality of sensing elements.
Figure 3:
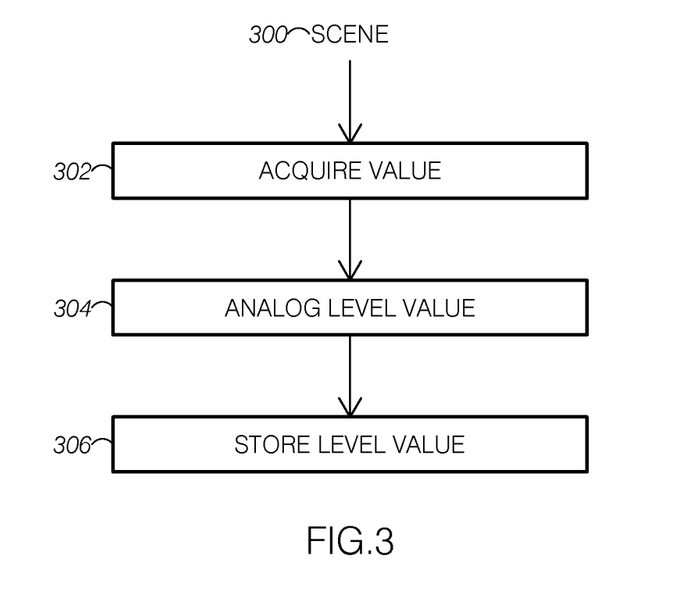
FIG. 3 shows a block diagram of an embodiment of the sensor block.

In this particular embodiment, the acquisition block, which obtains an image from a scene being analyzed by the processor, comprises a plurality of sensing elements 200. Each sensing element acquires 302 one part of the scene being analyzed 300 which is transformed in an analog value 304 and then stored 306. The plurality of analog values acquired by the plurality of the sensing elements forms the image of the scene.

Figure 4:
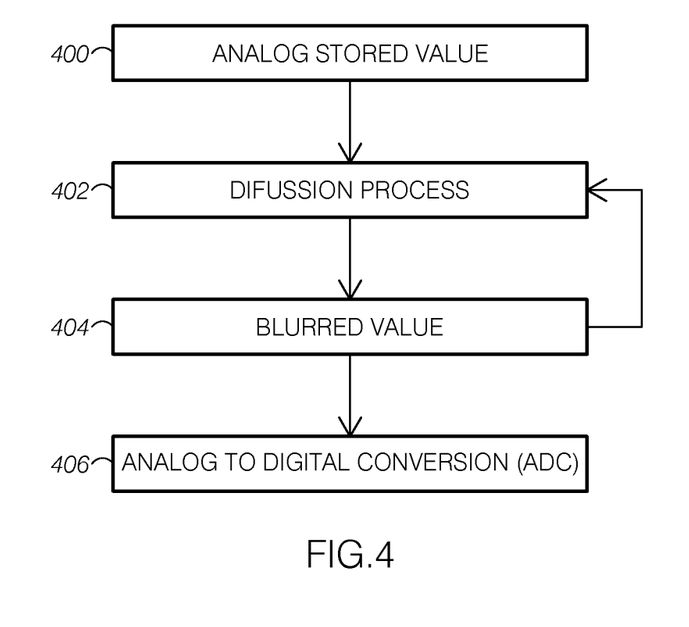
FIG. 4 shows a block diagram of an embodiment of the scale space generator.

The scale space generation block generates the scale space image (i.e., a set of blurred images obtained by applying Gaussian filters with a given sigma):

$$L(x,y,k\sigma)=G(x,y,k\sigma)*I(x,y) \quad (1)$$

where $G(x,y,k\sigma)$ is a Gaussian filter with a standard deviation $k\sigma$, $I(x,y)$ is the acquired image made up of the plurality of analog values acquired by the acquisition block, $L(x,y,k\sigma)$ is the obtained blurred image, and * is the convolution operation. According to one embodiment, a diffusion process 402 consisting of applying a Gaussian filter according to Eq. (1), is applied to the acquired analog value 400 obtained by the sensing element. The plurality of obtained values from the blurred image 404 is converted to a digital value by means of an Analog to Digital Converter (ADC) 406. The scale space is made up of blurred images whose degree of blur is increased applying iteratively a Gaussian filter with a given sigma.

Figure 5:
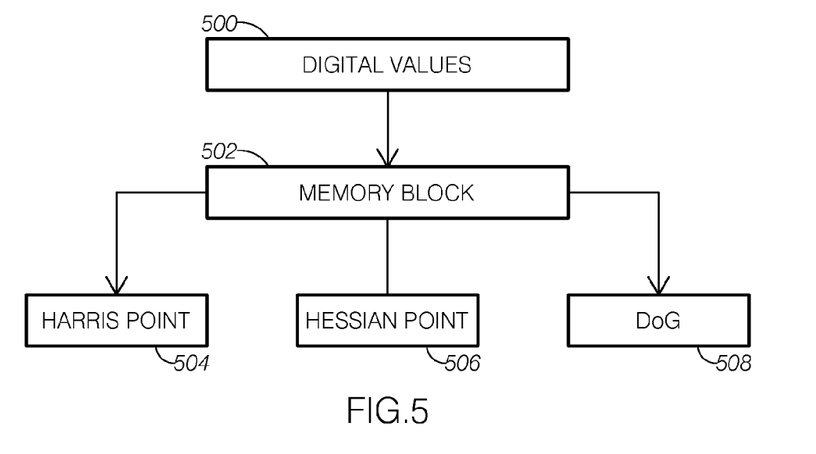
FIG. 5 shows a block diagram of an embodiment of the feature detector.

The digital values of the blurred images 500 are transferred to a memory block 502 comprising a plurality of memory elements. The stored values are sent to the different feature blocks, which implies different modes of operation:

Harris point detector 504: In this block, from the first blurred image a detection of Harris points is carried out. The detection of this feature involves the following operation through one image, a point is classified as Harris point whether the following value is higher than a given threshold:

$$Ha=(I_{gx}^2 I_{gy}^2 - I_{gxy})-K(I_{gx}^2+I_{gy}^2) \quad (2)$$

where $I_{gx}$ and $I_{gy}$ are the result from applying to the acquired image the gradient in the x and y directions, respectively, followed by a Gaussian filtering, $I_{gxy}$ is the product of image gradient in the x and y directions followed by a Gaussian filtering, and K is a predefined parameter.

Hessian point detector 506: In this block, from blurred images, a detection of Hessian points is performed. A point is classified as Hessian point whether the following value is higher than a given threshold:

$$He=I_{xx}I_{yy}-I_{xy}^2 \quad (3)$$

where $I_{xx}$ and $I_{yy}$ are, respectively, the second spatial derivatives of the image in the x and y direction, and $I_{xy}$ is the cross derivative in the x and y directions.

Difference of Gaussian (DoG) 508: In this case a difference between two successive images of the scale space is performed, i.e.:

$$DoG(x,y,k\sigma) = L(x,y,k\sigma) - L(x,y,(k-1)\sigma) \quad (4)$$

Figure 6:
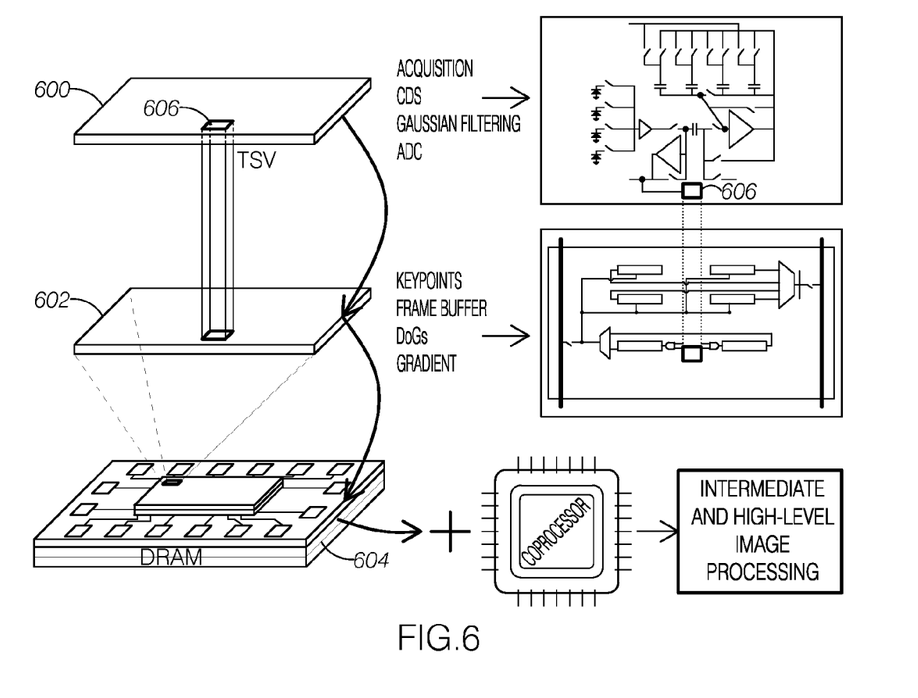
FIG. 6 shows one embodiment of the of the 3D-CMOS architecture.

According to one embodiment, the feature detector is implemented as a CMOS-3D integrated circuit. CMOS-3D technology allows integrating more functionality on the same chip taking advantage of several layers integration. The architecture of such an implementation comprises two top layers also called tiers 600 and 602, wherein the desired functionality is implemented and two additional layers of DRAM memory 604 for storing the data. The connection between two top layers is established through direct connections called Through-Silicon-Vias (TSV) 606. The top tier 600 includes image acquisition, scale space generation (Gaussian pyramid generation and its digitization) functionality. The second tier 602 comprises a feature detector block.

Figure 7:
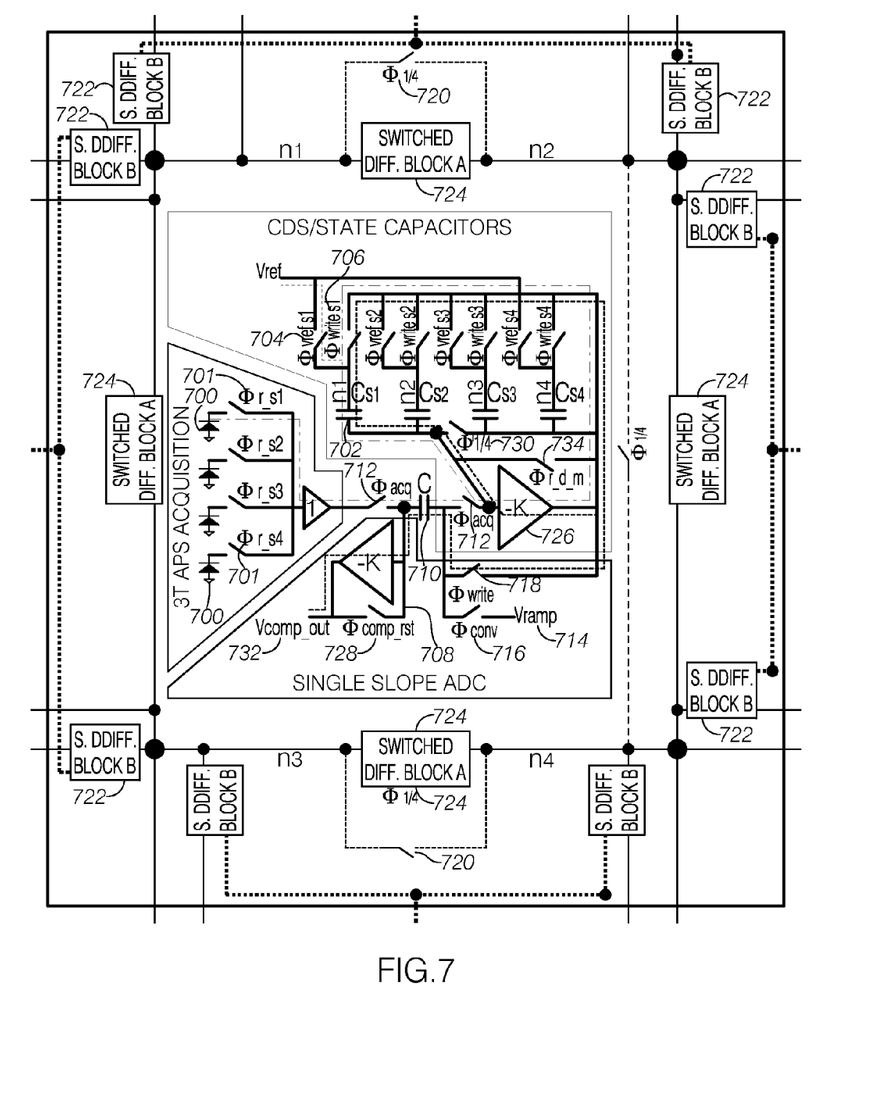
FIG. 7 shows one embodiment of a processor element of a tier which performs pixel acquisition and Gaussian filtering.
Figure 8:
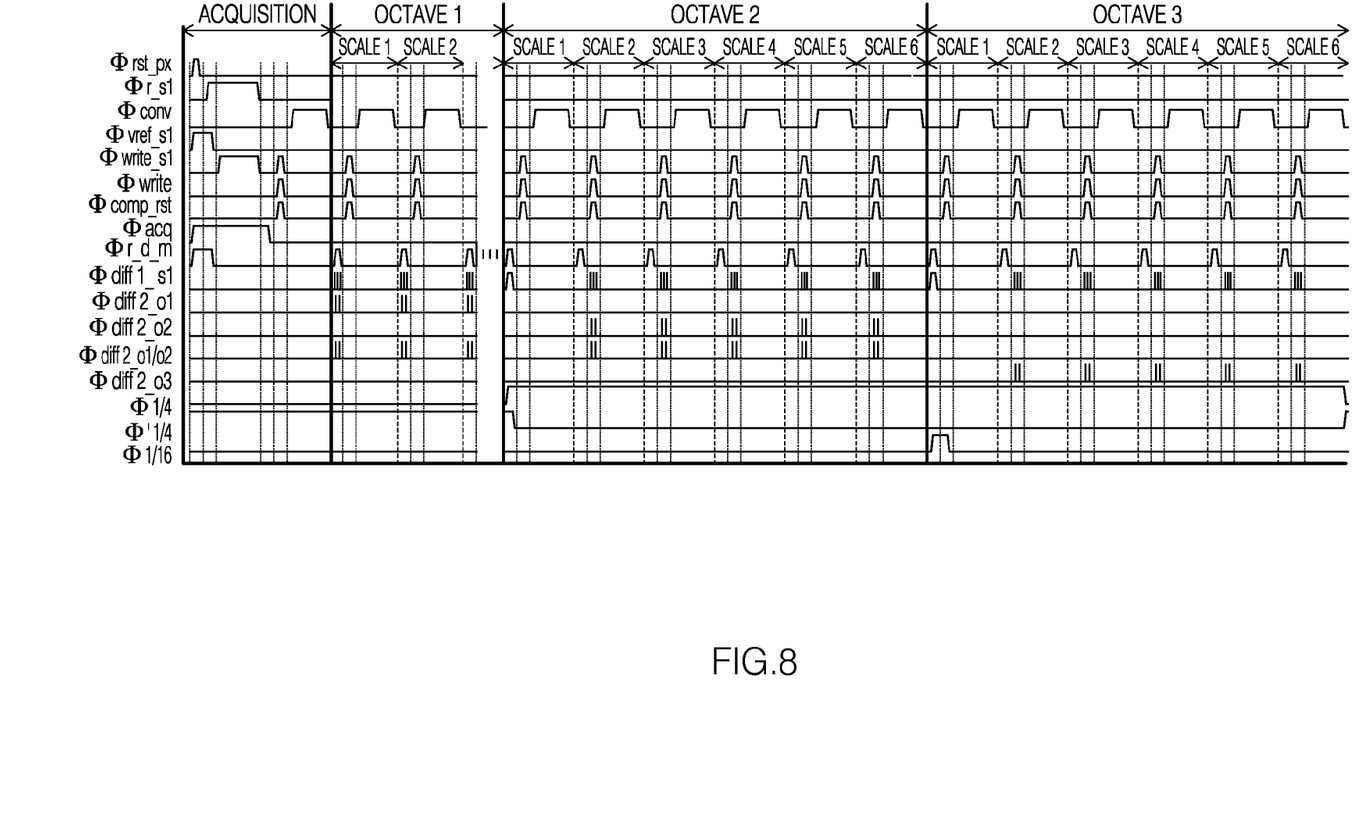
FIG. 8 shows an example of control signals chronograph for tier according to one embodiment.

The Tier 1 comprises a plurality of processor elements, each one is responsible for offset-corrected image capture, pixel binning and diffusion in cooperation with the neighboring elements, and contributes to fully-parallel single-ramp A/D conversion. To reduce area consumption, 4 photodiodes are assigned to each element. Image acquisition is performed using a 3 T Active Pixel Sensor (APS) 700, which together with the state capacitors 702, and capacitor C 710, make the Correlated Double Sampling according to a particular embodiment, and without limitation. The result of the acquisition is stored in the corresponding analog memory $C_{Si}$ 702 which is given by:

$$V_{Csi} = V_{ref} + \frac{C}{C_{Si}}(V_S(t_0) - V_S(t_1)) - V_Q \quad (5)$$

where $V_{ref}$ is an analog reference signal, $V_S(t_0)$ and $V_S(t_1)$ are the values sensed at the photodiode Si 700 at time instants $t_0$ and $t_1$ respectively, and $V_Q$ is the quiescent point of the inverter 726. The acquisition is controlled by signals $\phi_{r\_si}$, $\phi_{vref\_si}$, $\phi_{acq}$, $\phi_{r\_d\_m}$, $\phi_{write\_si}$, as shown in FIG. 8. According to the chronogram shown in FIG. 8, when the acquisition of pixel 1 is carried out the control signals $\phi_{rst\,1}$, $\phi_{aq}$ and $\phi w\,d\,m$ are on, thus transferring the corresponding value from the photodiode to the corresponding state capacitor for its further digitization and processing in the diffusion steps. Setting $\phi_{acq}$ to 0, and $\phi_{write\_si}$ to 1, the values stored at the output of the inverter can be read as:

$$V_{Si} = V_{ref} + \frac{C}{C_{Si}}(V_S(t_0) - V_S(t_1)) \quad (6)$$

Figure 9:
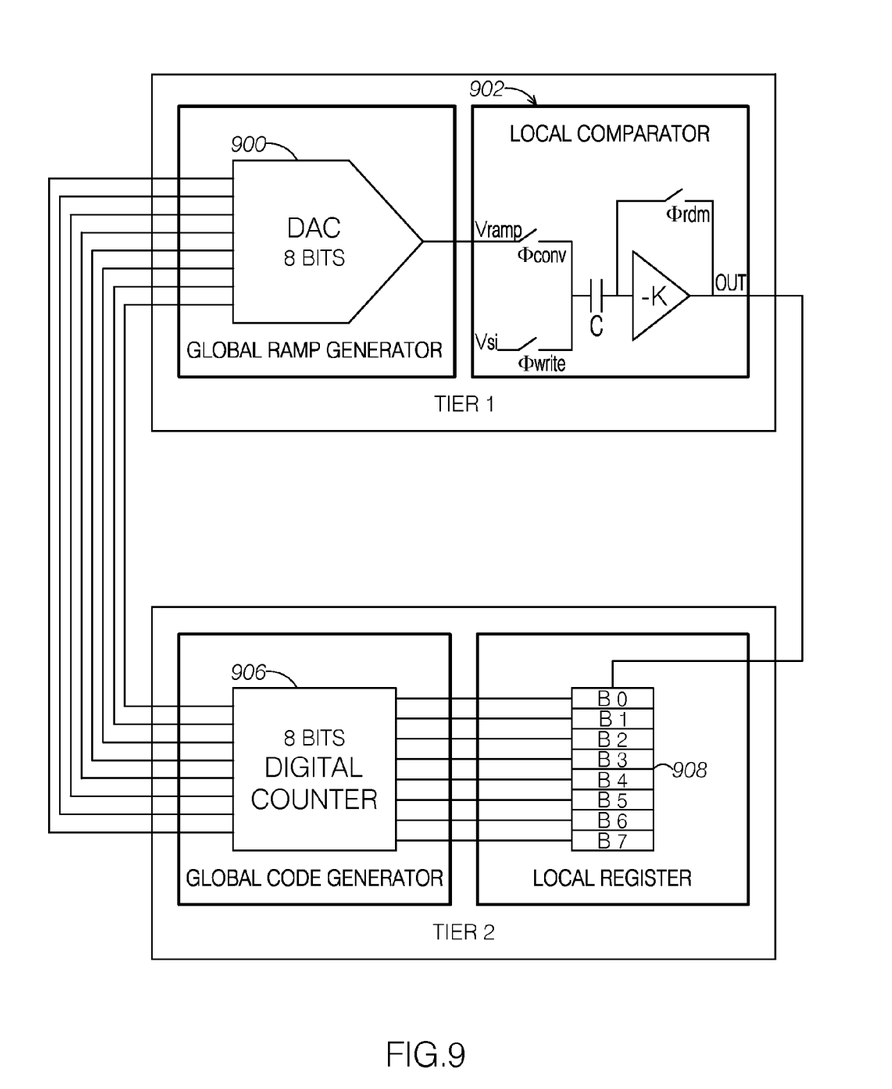
FIG. 9 illustrates the connection between the tiers according to one embodiment.

According to a particular embodiment, and without limitation, an 8-bit single slope ADC converter is used for converting analog acquired values to digital values. The comparator for the Analog to Digital (A/D) conversion 708 is realized with the inverter 726, and by reusing the capacitor C 710, when the signal $\phi_{acq}$ 712 is turned off. The ADC is distributed between the two tiers: the analog ramp generator 900 and the comparator 902 in the top tier, and a register 908 and a digital counter 906 in the bottom tier. To carry out the conversion, the value given by Eq. (6) is written in the capacitor C 710, enabling signals $\phi_{write\_si}$ 706, $\phi_{write}$ 718, and $\phi comp_{rst}$ 728. Secondly, this value is compared with the analog global ramp $V_{ramp}$ 714 by enabling $\phi_{conv}$ 716. After that, the output of the inverter 732 is given by:

$$V_{comp\_out} = -K(V_{ramp} - V_{Si}) + V_Q \quad (7)$$

When the first term of Eq. (7) has a zero crossing, the comparator changes the logic value at its output. The output of the comparator is the signal that enables/disables the reading of the registers allocated in the bottom tier. A Through Silicon Vias (TSV) drives this conversion signal to the registers storing the corresponding digital code.

The other functionality of the processors elements in the top tier is the Gaussian filtering, or scale space generation. The blocks 722 and 724, working together with the state capacitors 702 to execute this task. The peripheral blocks are implemented with a switched-capacitor network. The switches controlled by the signal $\phi_{1/4}$ make the downscaling ¼, merging the value of the four state capacitors for the second octave.

The Gaussian filtering, which is needed for the generation of the scale space, is the solution of the heat equation. According to one embodiment, it is implemented using a Resistive-Capacitive (RC) Network. A double Forward-Euler network has the same behavior as that of a continuous-time RC network, except by the discrete exchange of charge between neighboring nodes. A scheme of a node of the switched-capacitor network is displayed on FIG. 10(*a*). The exchange of charge to perform the diffusion process is made between the state capacitor 910, and those of the neighbors located along the cardinal directions. This discrete behavior lets a simple control of the σ level by the number of cycles of the non-overlapping signals $\phi_1$ 912, and $\phi_2$ 914.

Figure 10:
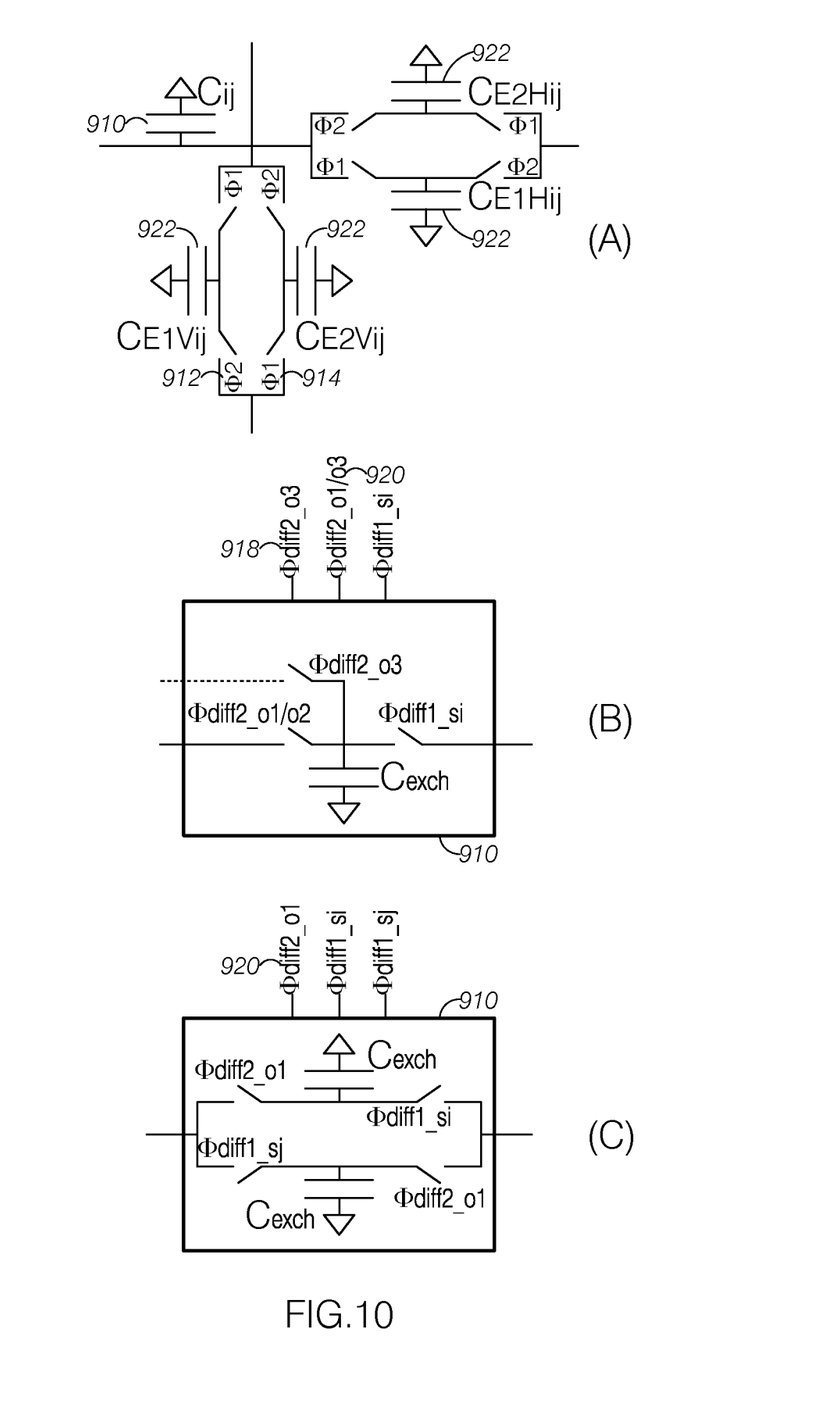
FIG. 10 shows the schematic of the switched-capacitor network according to one embodiment.

The Gaussian width σ of every cycle is fixed by the relation between the state and the exchange capacitors ($C/C_E$). In particular, the value of a node at a cycle n is given by:

$$V_{ij}(n) = \quad (8)$$
$$V_{ij}(n-1) + (V_{i-1j}(n-1) + V_{i+1j}(n-1) + V_{ij-1}(n-1) + V_{ij+1}(n-1) - 4V_{ij}(n-1))\frac{\frac{C}{C_E}}{1+4\frac{C_E}{C}}$$

On the other hand, the value for the same node in one iteration with a discrete Gaussian kernel where only the interaction with the cardinal neighbors is considered, is modeled by:

$$V_{ij}(n) = \quad (9)$$
$$V_{ij}(n-1) + (V_{i-1j}(n-1) + V_{i+1j}(n-1) + V_{ij-1}(n-1) + V_{ij+1}(n-1) - 4V_{ij}(n-1))\frac{e^{-\frac{1}{2\sigma^2}}}{1+4e^{-\frac{1}{2\sigma^2}}}$$

From Eqs. (8)-(9), the level per cycle can be written as:

$$\sigma_0 = \left(2\ln\frac{C}{C_E}\right)^{-\frac{1}{2}} \quad (10)$$

The application of two successive Gaussian filters or kernels with $\sigma_0$ is equivalent to a Gaussian kernel with a certain $\sigma$. This property allows to obtain, with a level of filtering $\sigma_0$ fixed by the $C/C_E$ ratio, to approach any Gaussian kernel by recursive filtering or application of Gaussian kernels of $\sigma_0$. The dependence of $\sigma$ with the number of cycles $\sigma=\sigma(n)$ is given by:

$$\sigma = \sqrt{\frac{2nC_E}{4C_E + C}} \quad (11)$$

The S scales of every octave for the Gaussian pyramid generation are generated with the same S values of $\sigma$. Peripheral blocks A 724 and B 722 make the interaction with neighbors along the cardinal directions. FIG. 10(b),(c) show their internal structure. For every state capacitor the processor element has four exchange capacitors 922. The endings o1 920, o2 920, and o3 918 in the signals names denote the octaves where they are used. After executing the diffusions needed for the first octave, the four state capacitors $C_{Si}$ 702 are merged into only one through the switches controlled by $\phi_{1/4}$ 720 making a downscaling ¼ of the image. In this situation, the blocks A 724 are in short-circuit, and therefore the ratio $C/C_E$ increases by a factor 2, changing the $\sigma=\sigma(n)$ relation of the system. To preserve the value of $\sigma$, the capacitors $C_{s3}$ and $C_{s4}$ are disabled after the merging. This is performed through the switch $\phi'_{1/4}$, 730.

Figure 11:
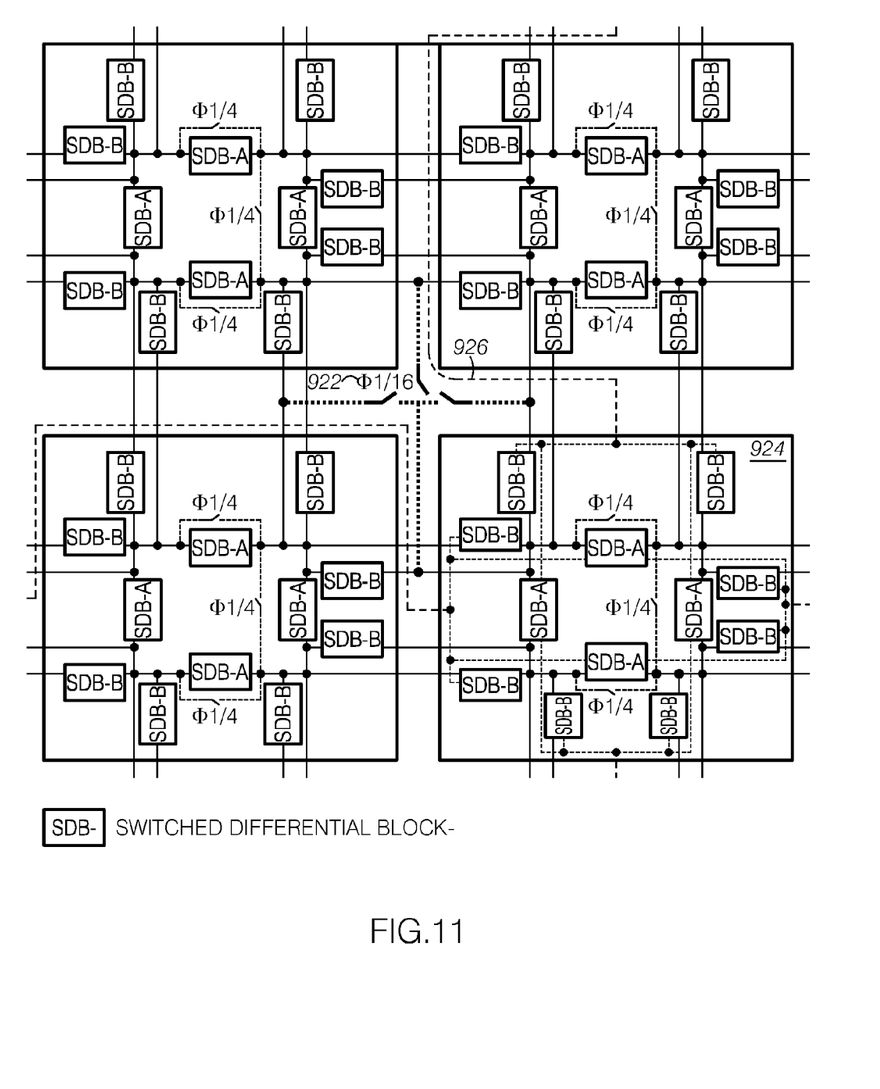
FIG. 11 shows the schematic diffusion network for a grid of 16×16 pixels according to one embodiment.

FIG. 11 sketches the network structure of 16×16 pixels, according to one embodiment. For the third octave this involves one more set of switches. Those are controlled by signal $\phi_{1/16}$ 922. When $\phi_{1/16}$ is on, the values stored in four cells are averaged in only one pixel, performing the downscaling of the original image from M/2×N/2 to M/4×N/4 resolution (or ¹⁄₁₆ resolution of the original image). After the merging, only one of the four cells keeps enabled 924. The filtering is made between these active cells similarly to the previous octaves through the paths drawn with a dotted-line 926.

Figure 12:
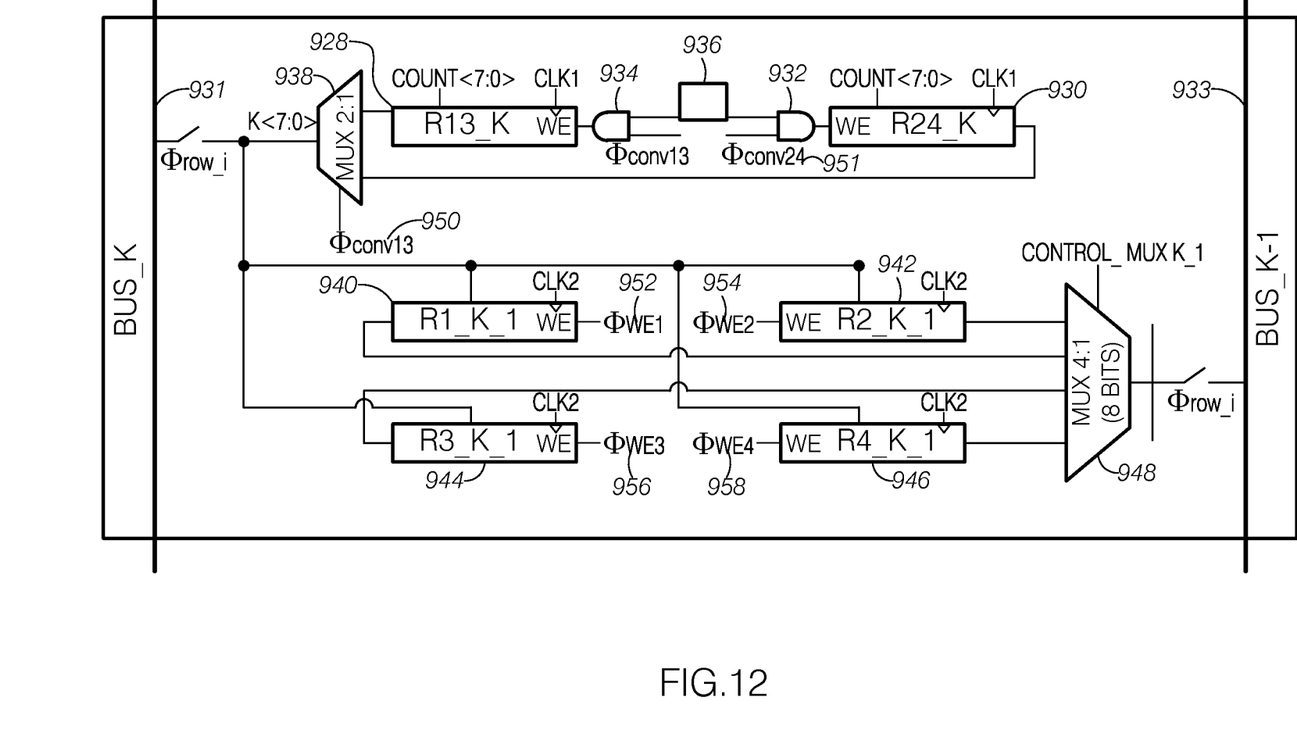
FIG. 12 shows one embodiment of a memory element of the frame buffer.

The ADC is shared among the two tiers. Being distributed, the comparators in the top tier, and the signals of a global counter (digital code generator) along the registers in the bottom tier, just one TSV is needed for a set of 4 pixels, namely for what we call a processor element in the top tier. The same array structure is repeated in the bottom tier, making it easier to have pitch-matched cells between the top and bottom tiers. Thus, the digitized pixels are written to an M/2× N/2, set of registers, where M and N are the sizes of the acquired image. Each one of these sets of registers comprises 6 8-bit registers 928, 930, 940, 942, 944 and 946. Two of them make the conversion of the scale k, 928 and 930, in conjunction with the comparator of the top tier, with k indicating the scale in a given octave. Two registers are needed to let the conversion of one pixel, while the others are being read for further processing. The remaining registers, 940, 942, 944 and 946, store the four values of the previous scale (k−1). This way the whole M×N image is stored in the bottom tier. We name these 4 pixels as: P1, P2, P3 and P4, which correspond with locations (i,j), (i, j+1), (i+1, j) and (i+1, j+1), respectively, where i indicates the row and j indicates the column within the image. The four pixels P1-P4 are digitized in series, as there is only one Through-Silicon-Vias (TSV) per every 4 pixels. This means that all pixels P1 are digitized in one conversion cycle, P2 in a second conversion cycle, and so on for pixels P3 and P4. Therefore, four serial conversion cycles are needed for the digitization of the whole image in the first octave. There is a 1-bit signal driving two AND gates, 932 and 934, with $\phi_{conv13}$ 950, and $\phi_{conv24}$ 951 as inputs, yielding the enable signals for the top two registers, R13_K 928 and R24_K 930, which receive the digitized value through the TSV 936. The top two registers 928 and 930, store the pixels of scale k. The four bottom registers, 940, 942, 944 and 946, keep pixels P1-P4 for scale k−1. Multiplexors 938 and 948 send k and k−1 scales to the data buses 931 and 933 for further processing. Scales k and k−1 are available on the corresponding buses of every set of registers for further calculations. The sequence of operations to achieve every scale in the first octave is as follows. Pixel P1 is digitized into register R13_K 928, with $\phi_{conv13}$ 950 on. Subsequently, Pixel P2 is digitized and stored in register R24_K 930 following a similar process with signal $\phi_{conv24}$ 951 on. During $\phi_{conv24}$ on the DoG for all pixels P1 of scale are calculated and written into a DRAM. After the reading of pixels P1 the content of register R13_K 928, is transferred into register R1_K_1 940 by means of signal $\phi_{W\_E1}$, 952 on. Later on, pixels P3 are digitized in register R13_K 928, while the pixels P2 are being read, and the process continues up to pixels P4, completing the first octave. Signals $\phi_{W\_E3}$, 956 and $\phi_{W\_E4}$ 958 play a similar role in the transfer and storage process from pixels P3 and P4, respectively.

Figure 13:
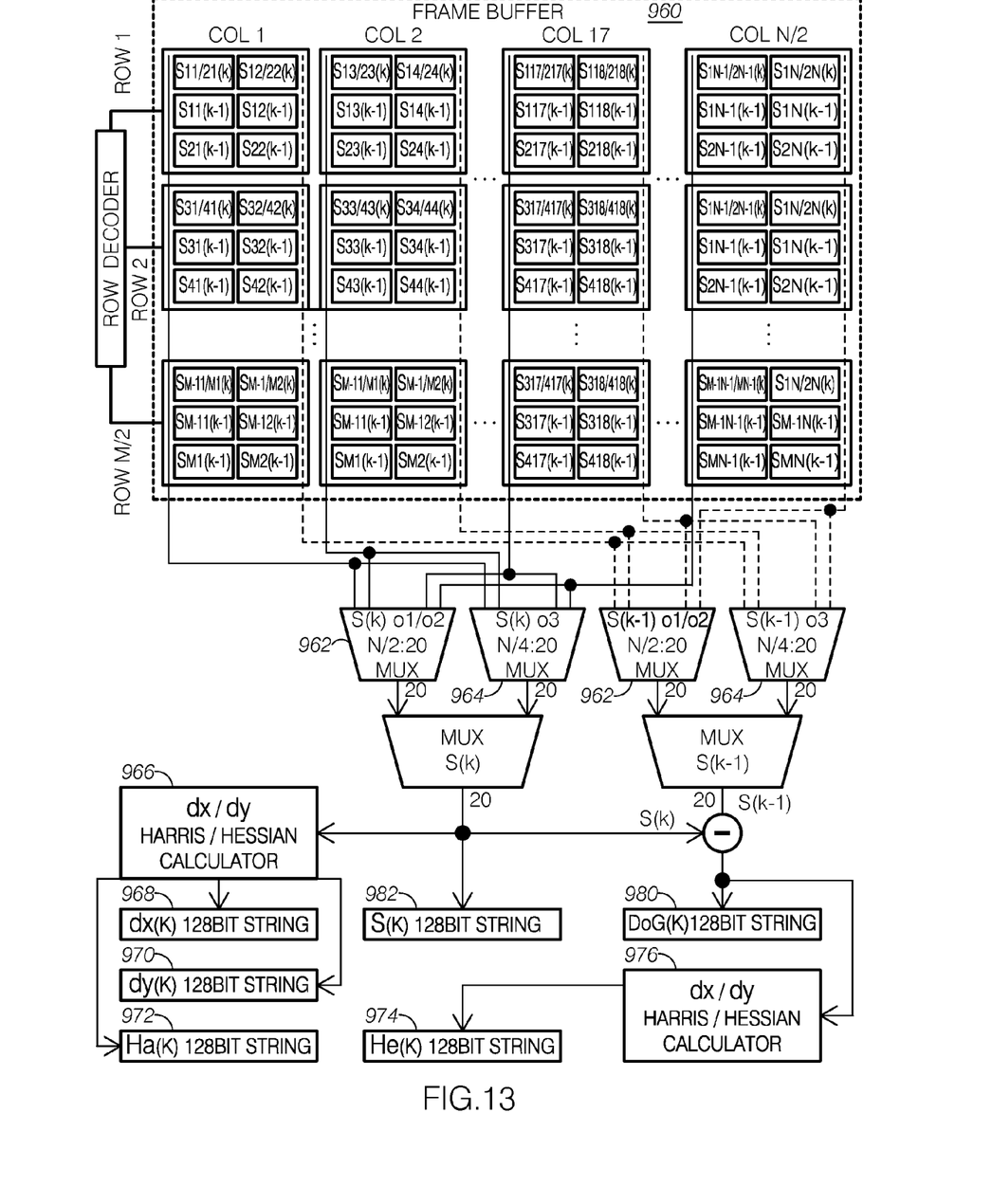
FIG. 13 shows the architecture of a second tier according to one embodiment.

According to one embodiment, the frame buffer 960 is an M/2×N/2 set of registers to store the different scales of the scale space. After every diffusion or Gaussian filtering of the image and its digitization, several operations are run in parallel: 1) the digitization of pixel P1 at scale k, 2) scales S(k) 982, 3) difference of Gaussian between scales k and k−1 DoG(k) 980, 4) horizontal gradient along the x and y direction for scale k, dx(k) 968, and dy(k) 970, as well as the corresponding values of dxx(k), dyy(k) and dxy(k), 5) Harris and Hessian, 966, keypoint detection over scales 972 and 6) Harris and Hessian 976 keypoint detector over DoGs 974. Subsequently, the results are sorted out in groups of 128 bits (16 words of 8 bits each) and transferred in burst mode to the DRAM memory. In a particular embodiment, the images from the buffer array are read in groups of 20 registers row by row in order to provide the 16 first and 16 second derivatives at the same time. For every row i, the columns of pixels Pi are selected through the four multiplexers, 962 and 964. Two of them are shared by the first and the second octaves for scales k and k−1, 962. Both scales are required in the DoG calculation. The two other multiplexers 964 are employed for the third octave. It should be noted that for the first and the second octaves, the multiplexers can be shared, as the access to the registers is made along a row. In the case of the first octave 4 cycles are required for readings and transferring pixels P1-P4. In the second octave and beyond, the transfer is carried out in only one cycle due to the ¼ and further downscalings.

The gradient calculation is a very common operation in image processing. Moreover, the first derivatives are used in subsequent tasks as orientation and vector descriptor of every keypoint in the SIFT algorithm. Also, the first derivatives can be used for the Harris detector. According to one particular embodiment, due to the assignment of 4 pixels to one processor in the top tier the reading mechanism does not permit to yield the first derivatives dx and dy of one pixel at one cycle. Consequently, it is accomplished by calculating the gradient along a different set of axes which have been rotated 45° with respect to the conventional x and y axes. The gradient is now calculated by the next set of equations:

$$d_x(i,j) = I(i+1,j+1) - I(i-1,j-1) \quad (12)$$

$$d_x(i,j) = I(i+1,j-1) - I(i-1,j+1) \quad (13)$$

The results of the Hessian 982 and Harris 984 are two images of M×N size of 1 and 2 bits per pixel, respectively. "1" means an extreme and "0" is a point without significant information for SIFT. The Harris algorithm has three states: "00" is a corner, "01" an edge and "1X" a flat. The block 986 in FIG. 14 reads the data from frame buffer registers 987 and makes one calculation per cycle (one pixel).

Figure 14:
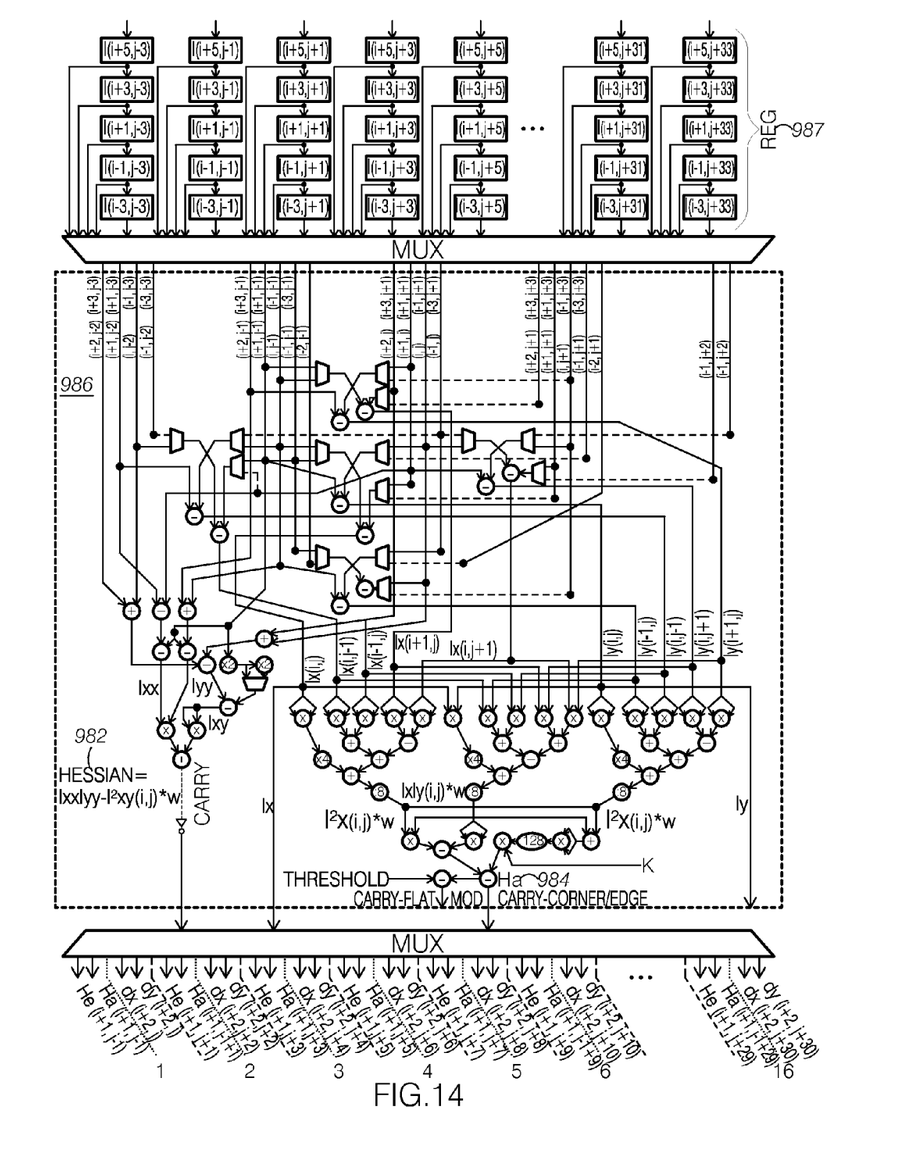
FIG. 14 shows the diagram block of the gradient, Harris point, Hessian point and DoG calculation.

Other detectors are based on the localization of characteristic points through the Hessian matrix 982. This matrix needs the second derivatives. The calculation of such derivatives requires the neighbors around a point in a 4-neighborhood. As it was mentioned before, in the reading mechanism of the embodiment disclosed above, a given pixel does not have the right neighbors to perform the first derivatives along the conventional x and y axes (horizontal and vertical directions). It would be possible, however, to do such an operation with pixels located two pixels apart. An approach to the second derivative is made by generating the neighbor located one pixel apart along the horizontal and vertical directions by interpolating the pixels located two pixels apart from the one under study. Thus, in this procedure, the neighbor at (i+1; j) is generated as I(i+1; j)=[I(i+2; j)+I(i; j)]/2. With this approximation the second derivatives are given by:

$$d_{xx}(i,j) = I(i,j+u) + I(i,j-u) - vI(i,j) \quad (14)$$

$$d_{yy}(i,j) = I(i+u,j) + I(i-u,j) - vI(i,j) \quad (15)$$

$$d_{xy}(i,j) = I(i+u,j+u) + I(i+u,j-u) + I(i-u,j+u) + I(i-u,j-u) - 2vI(i,j) \quad (16)$$

where u=2 and v=1 for the first octave, and u=1 and v=2 for the next octaves, given that at the second and the third octaves every pixel has the right neighbors along horizontal and vertical directions to perform the gradient along the conventional x and y axes, and thus the approach with the interpolation is not needed.

While particular embodiments have been described, it is understood that, after learning the teachings contained in this disclosure, modifications and generalizations will be apparent to those skilled in the art without departing from the spirit of the disclosed embodiments. It is noted that the foregoing examples have been provided merely for the purpose of explanation and are in no way to be construed as limiting. While the image processor and method have been described with reference to various embodiments, it is understood that the words which have been used herein are words of description and illustration, rather than words of limitations. Further, although the embodiments have been described herein with reference to particular means, materials and embodiments, the actual embodiments are not intended to be limited to the particulars disclosed herein; rather, the system extends to all functionally equivalent structures, methods and uses, such as are within the scope of the appended claims. Those skilled in the art, having the benefit of the teachings of this specification, may effect numerous modifications thereto and changes may be made without departing from the scope and spirit of the disclosed embodiments in its aspects.

The invention claimed is:

1. An image processor for feature detection comprising a single non-planar chip containing a plurality of integrated sensing and processing resources across two or more layers adapted to capture image frames and extract image features, wherein said non-planar chip is a three dimensional CMOS integrated circuit with vertical distribution of sensing and processing resources across two or more vertical integrated circuit layers and wherein said three dimensional CMOS integrated circuit comprises an array of in-pixel processors and a plurality of circuits that in parallel realize a scale invariant feature transform detector (SIFT), a Harris-based feature detector, and a Hessian-based feature detector.

2. The image processor of claim 1, wherein said three dimensional CMOS integrated circuit implements said feature detectors by reusing a plurality of circuits employed for gradient and keypoint detection.

3. The image processor of claim 1, wherein said three dimensional CMOS integrated circuit implements a pixel-per-processor architecture to achieve massive pixel-level parallelism and pixel-level operation capability.

4. The image processor of claim 1, wherein said plurality of circuits include a multiple purpose switched-capacitor network.

5. The image processor of claim 4, wherein said multiple purpose switched-capacitor network implements Gaussian pyramid generation, in-pixel correlated double sampling (CDS), and a pixel-level analog memory.

6. The image processor of claim 5, wherein said multiple purpose switched-capacitor network has a double Forward-Euler configuration.

7. The image processor of claim 6, wherein said three dimensional CMOS integrated circuit includes shared reused circuits for in-pixel analog-to-digital conversion and frame buffering.

8. The image processor of claim 7, wherein said circuits of said three dimensional CMOS integrated circuit are arranged in three layers with (a) a tier for acquisition, correlated double sampling, Gaussian filtering, and analog-to-digital conversion; (b) a tier for digital frame buffering, keypoint detection, Difference-of-Gaussians (DoGs) calculation, gradient calculation, and shared analog-to-digital conversion; and (c) two tiers with a DRAM memory.

9. A method for achieving efficient image feature detection on an integrated circuit, comprising:
   (a) implementing a single non-planar chip containing a plurality of integrated sensing and processing resources across two or more layers adapted to capture image frames and extract image features, wherein said non-planar chip is a three dimensional CMOS integrated circuit with vertical distribution of sensing and processing resources across two or more vertical integrated circuit layers and wherein said three dimensional CMOS integrated circuit comprises an array of in-pixel processors and a plurality of circuits that in parallel realize a scale invariant feature transform detector (SIFT), a Harris-based feature detector, and a Hessian-based feature detector; and
   (b) reusing a plurality of circuits in said non-planar chip to achieve concurrent implementation of gradient and keypoint detection; and correlated double sampling (CDS) and analog-to-digital conversion.

10. The method of claim 9, wherein said three dimensional CMOS integrated circuit implements a pixel-per-processor to achieve massive pixel-level parallelism and pixel-level operation capability;
   said plurality of circuits include a multiple purpose switched-capacitor network;
   said multiple purpose switched-capacitor network implements Gaussian pyramid generation, in-pixel correlated double sampling (CDS), and a pixel-level analog memory;
   said three dimensional CMOS integrated circuit includes shared circuits for in-pixel analog to digital conversion and frame buffering;

said multiple purpose switched-capacitor network implements Gaussian pyramid generation, in-pixel correlated double sampling (CDS), and a pixel-level analog memory;
said multiple purpose switched-capacitor network has a double Forward-Euler configuration;
said three dimensional CMOS integrated circuit includes shared circuits for in-pixel analog to digital conversion and frame buffering; and
said circuits of said three dimensional CMOS integrated circuit are arranged in three layers with (a) a tier for acquisition, correlated double sampling, Gaussian filtering, and analog-to-digital conversion;
  (b) a tier for digital frame buffering, keypoint detection, Difference-of-Gaussians (DoGs) calculation, gradient calculation, and shared analog-to-digital conversion; and
  (c) a tier with a DRAM memory.

* * * * *